(12) United States Patent
Singh (10) Patent No.: US 10,380,009 B2
(45) Date of Patent: Aug. 13, 2019

(54) CODE USAGE MAP

(71) Applicant: Walmart Apollo, LLC, Bentonville, AR (US)

(72) Inventor: Abhishek Kumar Singh, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 347 days.

(21) Appl. No.: 15/055,501

(22) Filed: Feb. 26, 2016

(65) Prior Publication Data

US 2016/0253256 A1 Sep. 1, 2016

Related U.S. Application Data

(60) Provisional application No. 62/121,795, filed on Feb. 27, 2015.

(51) Int. Cl.
*G06F 11/36* (2006.01)
*G06F 9/455* (2018.01)

(52) U.S. Cl.
CPC ...... *G06F 11/3692* (2013.01); *G06F 9/45516* (2013.01); *G06F 11/3688* (2013.01)

(58) Field of Classification Search
CPC .................................................. G06F 11/3692
USPC ........................................................ 717/125
See application file for complete search history.

(56) References Cited

U.S. PATENT DOCUMENTS

| | | | |
|---|---|---|---|
| 6,407,753 B1 * | 6/2002 | Budinsky | G06N 5/022 706/59 |
| 6,654,949 B1 * | 11/2003 | Fraenkel | G06F 11/3466 714/E11.2 |
| 6,662,357 B1 | 12/2003 | Bowman-Amuah | |
| 7,139,999 B2 | 11/2006 | Bowman-Amuah | |
| 7,292,990 B2 | 11/2007 | Hughes | |
| 7,426,717 B1 * | 9/2008 | Schang | G06F 11/3664 714/E11.207 |
| 7,596,778 B2 | 9/2009 | Kolawa et al. | |
| 7,647,579 B2 | 1/2010 | Drissi et al. | |
| 7,778,866 B2 | 8/2010 | Hughes | |
| 7,810,070 B2 | 10/2010 | Nasuti et al. | |

(Continued)

OTHER PUBLICATIONS

Andrzej Wasylkowski. 2007. Mining Object Usage Models. In Companion to the proceedings of the 29th International Conference on Software Engineering (ICSE Companion '07). IEEE Computer Society, Washington, DC, USA, 93-94. (Year: 2007).*

(Continued)

*Primary Examiner* — James D. Rutten
(74) *Attorney, Agent, or Firm* — McCarter & English, LLP; David R. Burns (57) ABSTRACT

A method for dynamically enforcing a code usage policy including mapping machine code compiled from source code to identify construct interactions in the machine code, determining whether the construct interactions identified by the mapping conform to one or more construct interaction maps in a construct interaction registry associated with a code usage policy, and generating instructions to render one or more error messages within a graphical user interface of a development environment in response to a determination that one or more of the construct interactions in the machine code fails to comply with at least one of the construct interaction maps in the construct interaction registry.

23 Claims, 7 Drawing Sheets

(56) References Cited

U.S. PATENT DOCUMENTS

| | | | |
|---|---|---|---|
| 7,921,390 B2 | 4/2011 | Archambeault et al. | |
| 8,032,863 B2 | 10/2011 | Kolawa et al. | |
| 8,281,288 B1* | 10/2012 | Spencer | G06F 8/20 |
| | | | 709/201 |
| 8,356,278 B2 | 1/2013 | Drissi et al. | |
| 8,527,937 B2* | 9/2013 | Bertelrud | G06F 8/71 |
| | | | 717/101 |
| 8,584,085 B2 | 11/2013 | Kaulgud et al. | |
| 8,839,211 B2 | 9/2014 | Kaulgud et al. | |
| 2005/0015732 A1* | 1/2005 | Vedula | G06F 8/34 |
| | | | 715/805 |
| 2005/0166094 A1* | 7/2005 | Blackwell | G06F 11/3664 |
| | | | 714/38.14 |
| 2007/0010330 A1* | 1/2007 | Cooper | A63F 9/183 |
| | | | 463/42 |
| 2007/0074167 A1* | 3/2007 | Cohrs | G06F 11/3672 |
| | | | 717/124 |
| 2008/0129988 A1* | 6/2008 | Saito | G01N 21/9501 |
| | | | 356/237.2 |
| 2008/0148235 A1* | 6/2008 | Foresti | G06F 11/3604 |
| | | | 717/123 |
| 2010/0107146 A1* | 4/2010 | Wrighton | G06F 8/20 |
| | | | 717/134 |
| 2011/0055815 A1* | 3/2011 | Squillace | G06F 11/3612 |
| | | | 717/125 |

OTHER PUBLICATIONS

Heuzeroth et al., Automatic Design Pattern Detection, published in IWPC '03 Proceedings of the 11th IEEE International Workshop on Program Comprehension, 2003, 10 pages. Downloaded from www.eecs.yorku.ca/course_archive/2004-05/F/6431/ADPD.pdf, last accessed Dec. 16, 2014.

Wong et al., Detecting Design Defects Caused by Design Rule Violations, Drexel University, 2009, 10 pages. Downloaded from https://cs.drexel.edu/files/jmf323/wong09.pdf, last accessed Dec. 16, 2014.

* cited by examiner

CODE USAGE MAP

CROSS-REFERENCE TO RELATED APPLICATIONS

This application claims priority to and benefit of U.S. Provisional Patent Application No. 62/121,795, filed Feb. 27, 2015, the disclosure of which is incorporated herein by reference in its entirety.

FIELD OF TECHNOLOGY

Embodiments of the of the present disclosure relate generally to computer programming architecture and more particularly to code usage mapping for design pattern detection.

BACKGROUND

Conventionally, large scale software development relies on architectural coding standards dictating a code usage policy for acceptable software coding practices and usage patterns to provide consistency in the interactions between various constructs such as classes, interfaces, containers, namespaces, libraries, other language constructs, etc. Additionally, different aspects of such development projects are often executed by a plurality of teams, operating at different tiers of the project. For example, a small team of engineers may comprise one of a plurality of teams, each team's code being integrated by one of a fewer number of group level teams, the coding from which is then integrated into a single project level software code product. Each of these tiers relies on a particular code usage policy in order to avoid inconsistencies in construct interactions and the code from each team and group must be compatible at the project level.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

As discussed above, large scale software development projects conventionally rely on tiered code usage policies in order to avoid inconsistencies in construct interactions in each level and between tiers. Failure to adhere to such code usage policies can lead, for example, to the introduction of program errors, unreliability, instability, and/or poor performance.

In general, the vast majority of such errors are introduced during the design/coding stage, prior to integration, testing, and production/product support. Unfortunately most such errors are not discovered until the production/support phase. This is particularly disadvantageous because, due to increasing difficulty in identifying the problem, customer involvement, and the need to redo various integration, testing, and production steps, the cost of fixing errors increases exponentially as the software progresses from design/coding, through integration and testing to production/product support.

Methods and systems are provided herein for dynamically enforcing a code usage policy, in accordance with various embodiments. The methods and systems can include mapping machine code compiled from source code to identify construct interactions in the machine code. The methods and systems can also include determining whether the construct interactions identified by the mapping conform to one or more construct interaction maps in a construct interaction registry associated with a code usage policy. The methods and systems can also include generating instructions to render one or more error messages within a graphical user interface of a development environment in response to a determination that one or more of the construct interactions in the machine code fails to comply with at least one of the construct interaction maps in the construct interaction registry.

Figure 1:
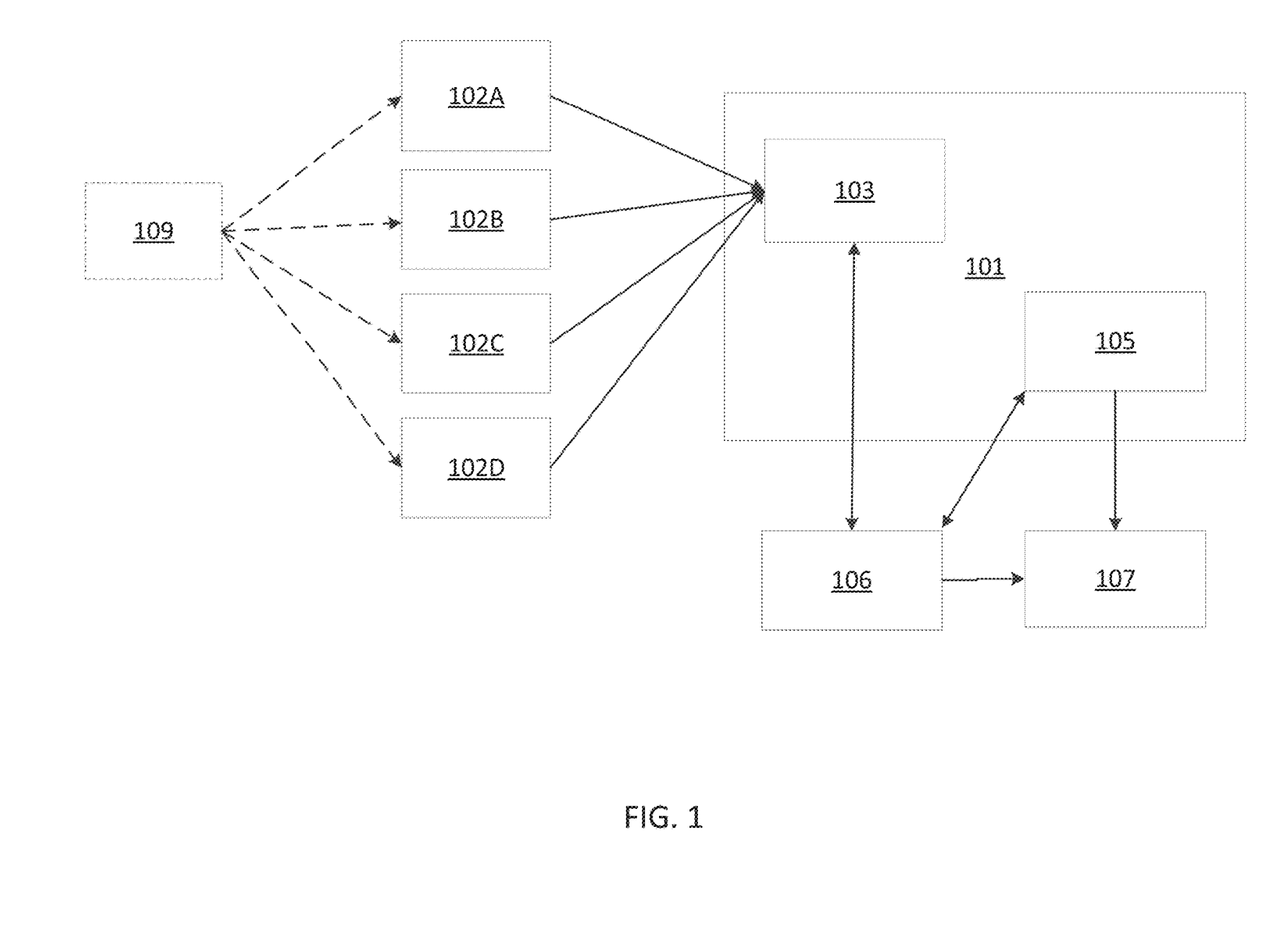
FIG. 1 is a block diagram showing a code usage mapping system for dynamically enforcing a code usage policy in accordance with various embodiments.

Referring now to FIG. 1, an exemplary system 100 for dynamically enforcing a code usage policy includes a processor 106 and a memory 101 having stored thereon a construct interaction registry 103 and a monitoring component 105. In accordance with various embodiments, the construct interaction registry 103 includes a plurality of policy construct interaction maps 102A-D defining permitted and/or prohibited interactions between various constructs such as classes, interfaces, containers, namespaces, libraries, other language constructs, etc. such that, taking the plurality of policy construct interaction maps 102A-D as a whole, the construct interaction registry 103 defines the code usage policy. The monitoring component 105 maps identified construct interactions in machine code, either as the machine code is compiled from, or after the machine code is compiled from, source code located within a software development environment 107 having a graphical user interface. The processor 106 (e.g., as further described below with reference to FIG. 5) is programmed, configured, or both to compare the mapped construct interactions from the monitoring component 105 with the construct interaction registry 103 and, upon detecting one or more construct interactions in the machine code that fail to comply with at least one of the policy construct interaction maps 102A-D in the construct interaction registry 103, instructs the development environment 107 to render an error message within the graphical user interface.

Therefore, the system 100 for dynamically enforcing a code usage policy is, in accordance with various embodiments, capable of identifying violations of the code usage policy and providing error messages within the development environment 107 in real-time during the design/coding stage. Because the design/coding stage is when the majority of errors are introduced, the system 100 for dynamically enforcing a code usage policy advantageously avoids the increased time, cost, and product instability associated with later-discovered violations.

Memory 101, as further described below with reference to FIG. 5, can include any suitable memory, including, for example, memory of a display device, a server, a computer, a cloud storage medium, random access memory, one or more types of hardware memory, non-transitory tangible media (for example, one or more magnetic storage disks, one or more optical disks, one or more flash drives) and/or any other suitable device. It will be apparent in view of this disclosure that, although depicted as stored together within a single memory 101, the code interaction registry 103 and monitoring component 105 can each be stored in separate memories and/or can each be distributed throughout multiple memories.

Construct interaction registry 103 includes a plurality of policy construct interaction maps 102A-D which, as a whole, describe a code usage policy required for a particular software development project for which the system is to be used. In accordance with various embodiments, a software architecture designer or code usage policy designer can create the plurality of policy construct interaction maps 102A-D in order to generate the construct interaction registry 103 according to the appropriate code usage policy.

In accordance with various embodiments, the policy construct interaction maps 102A-D can be created via a graphical user interface of an registry creation environment 109. The designer can create policy construct interaction maps 102A-D for populating the construct interaction registry 103 within the registry creation environment 109 by, for example, specifying a first construct, specifying an operator, and specifying a second construct and saving this relationship as a policy construct interaction map 102A-D. The designer, in accordance with various embodiments, can also specify whether the created policy construct interaction map 102A-D is inclusionary or exclusionary (i.e., whether the created policy construct interaction map 102A-D indicates an acceptable construct interaction or an unacceptable construct interaction) such that the construct interaction registry can include both inclusionary and exclusionary interaction maps. It will be apparent in view of this disclosure that the inclusionary/exclusionary designation can, in accordance with various embodiments, be made at the construct interaction registry 103 level instead, thereby designating all of the policy construct interaction maps 102A-D as an inclusion list or an exclusion list. In accordance with various embodiments, the registry creation environment 109 can advantageously include a conflict checking tool for insuring that none of the policy construct interaction maps 102A-D within the construct interaction registry 103 conflicts with any of the other policy construct interaction maps 102A-D, thus providing quality control over the creation of the construct interaction registry 103 and/or can establish a priority or hierarchy of construct interaction maps within the construct registry such that the application of certain construct interaction maps may be precluded by other construct interaction maps having a higher priority or that are higher in the hierarchy.

In accordance with various embodiments, the code interaction registry 103 can also be populated within the registry creation environment 109 via a template comprising a plurality of pre-programmed policy construct interaction maps 102A-D. Templates can, in accordance with various embodiments, be advantageous for providing a rules inheritance feature of the system. For example, in an exemplary tiered structure having coding teams and designers at a high project level, a middle group level, and a lower team level, a project (high) level designer can create a project level construct interaction registry with a plurality of project level construct interaction maps which can then serve as a template for a group level designer. The group level designer can add group level construct interaction maps to the project level construct interaction registry template, thereby creating a group level construct interaction registry which can then serve as a template for a team level designer. Finally, the team level designer can add team level construct interaction maps to the group level construct interaction registry template, thereby creating a team level construct interaction registry with inherited rules from the project and group levels for use by team members during coding. It will be apparent in view of this disclosure that, in accordance with various embodiments, the rules inheritance can be provided through other means such as by configuring the system 100 to refer to three separate construct interaction registries (e.g., a project registry, a group registry, and a team registry) and setting rules regarding which code usage registry supersedes the others in the event of a conflict between two or more code usage maps). However, incorporating the rules inheritance feature into a template can be advantageous because it can eliminate the need for redundant registries and allow for greater customizability as needed on a project by project or team by team basis.

Figure 4A:
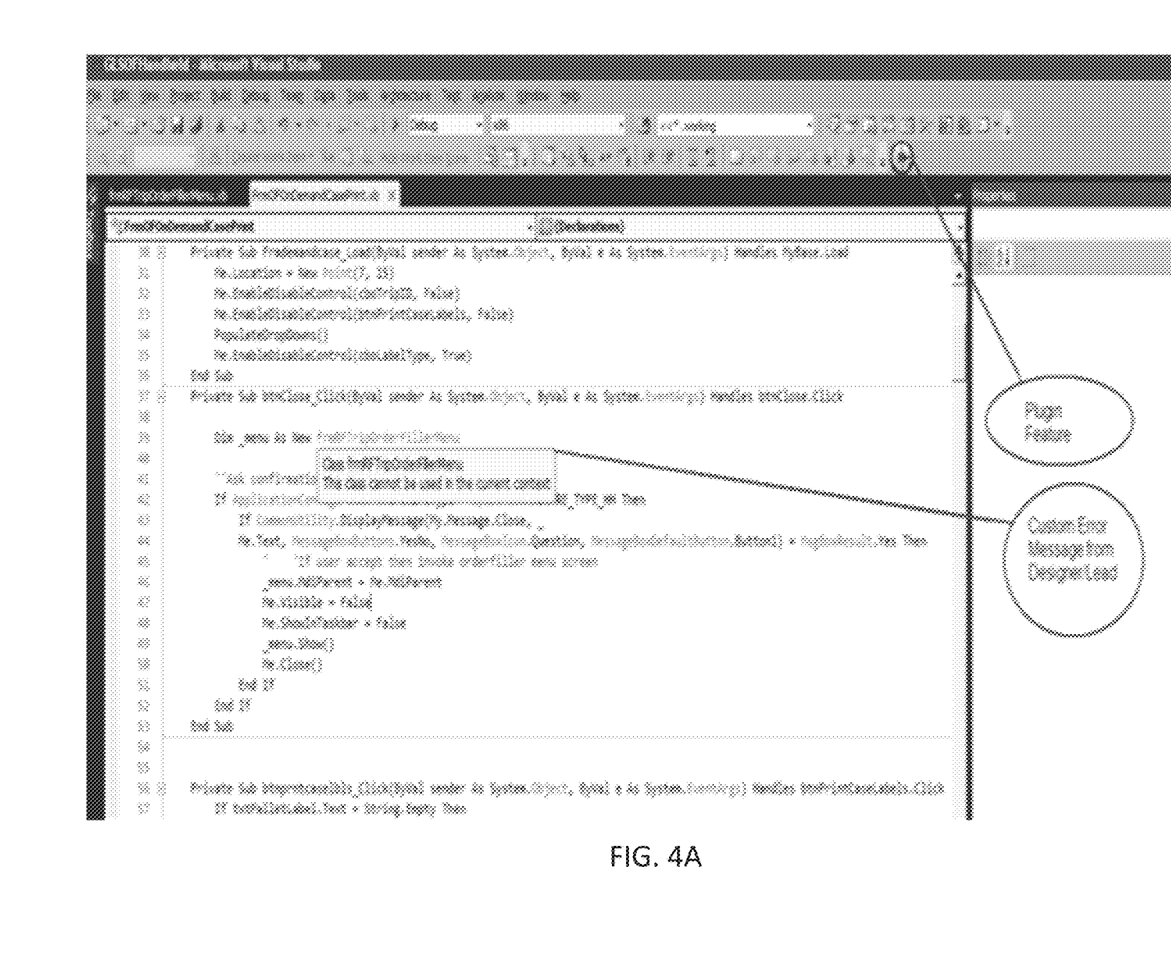
FIGS. 4A-4B are representations of error messages displayed within graphical user interfaces of software development environments in accordance with various embodiments.
Figure 4B:
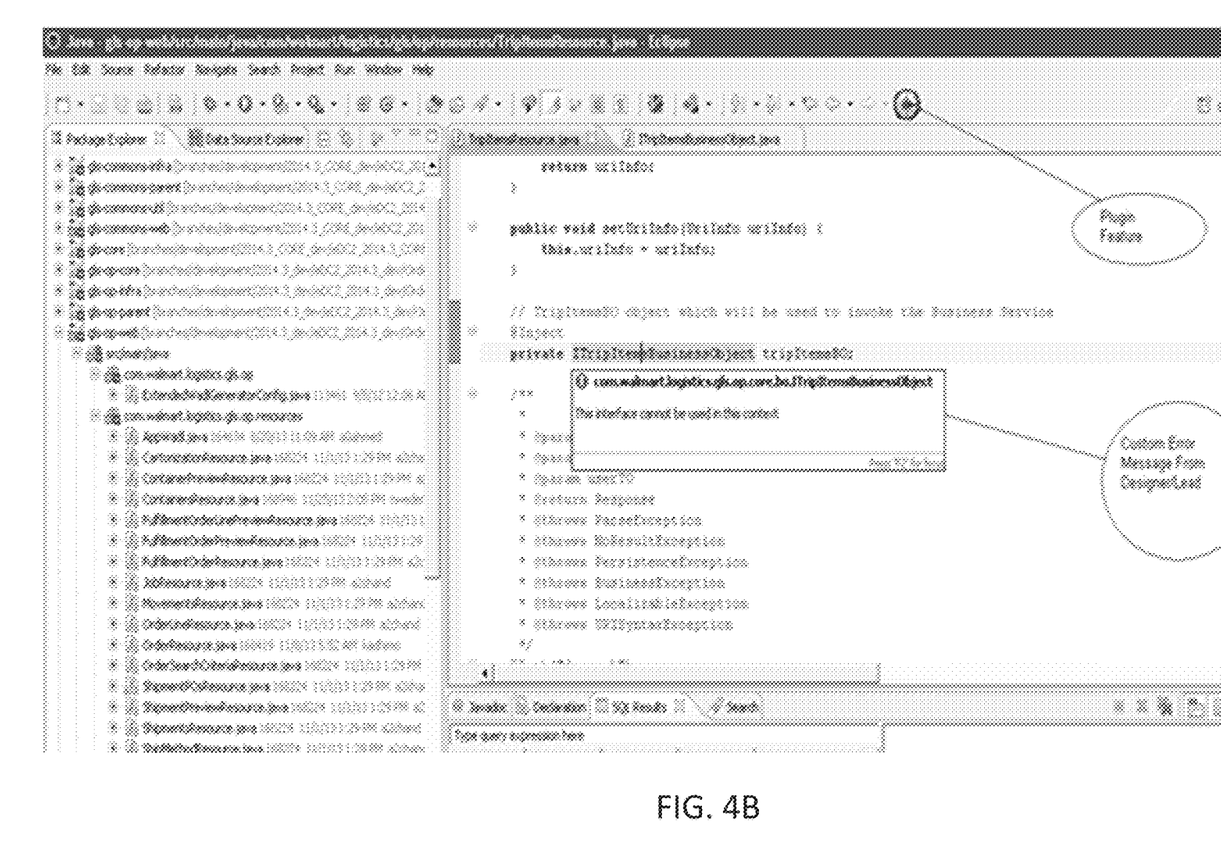

The monitoring component 105, in accordance with various embodiments, can be a standalone application and/or can be implemented as a plug-in or add-on for a software development environment. For example and for illustration purposes only, as shown in FIGS. 4A and 4B, the monitoring component can be implemented as a plugin for VISUAL STUDIO® (Microsoft, Redmond, Wash.) (see FIG. 4A) or as a plugin for ECLIPSE IDE™ (Eclipse Foundation, Ottawa, Ontario, Canada) (see FIG. 4B) in accordance with various embodiments. Once installed/activated, monitoring component 105 creates maps of identified compiled construct interactions in machine code, either as the machine code is compiled from, or after the machine code is compiled from, source code located within a software development environment 107 having a graphical user interface. Using the processor 106, the monitoring component 105 compares the mapped compiled construct interactions created from the compiled machine code with the policy construct interaction maps 102A-D within the construct interaction registry 103. Upon detecting one or more identified compiled construct interactions maps in the machine code that fail to satisfy or comply with at least one of the policy construct interaction maps 102A-D in the construct interaction registry 103, the monitoring component instructs the development environment 107 to render an error message within the graphical user interface. In accordance with various embodiments, the monitoring component 105 can be configured to continuously compile the source code being developed and create compiled construct interaction maps from the machine code associated with the source code as the code is written and/or edited. In accordance with various embodiments, the monitoring component 105 can also or alternatively be configured to compile the source code being developed and create compiled construct interaction maps from the machine code associated with the source code in response to the source code being saved (e.g., by auto-save or by a user input). In accordance with various embodiments, the monitoring component 105 can also or alternatively be configured to compile the source code being developed and create compiled construct interaction maps from the machine code associated with the source code in response to an indication by a user that a section or block of source code is complete and ready for higher level integration. In accordance with various embodiments, the monitoring component 105 can also or alternatively be configured to compile the source code being developed and create compiled construct interaction maps from the machine code associated with the source code in response to a user command.

The software development environment 107 can be any suitable computer programming interface for use by a computer programmer for writing computer code. Such software development environments can include, for example but not limited to, VISUAL STUDIO® (Microsoft, Redmond, Wash.) as shown in FIG. 4A, ECLIPSE IDE™ (Eclipse Foundation, Ottawa, Ontario, Canada) as shown in FIG. 4B, MATLAB® (Mathworks, Natick, Mass.), NETBEANS® (Oracle, Redwood Shores, Calif.), etc.

The registry creation environment 109 can be any suitable environment for establishing one or more construct interaction maps 102A-D or relationships between constructs. For example, in accordance with various embodiments, registry creation environment 109 can be a text file. In accordance with other embodiments, registry creation environment 109 can be a customized graphical user interface for establishing a first construct-operator-second construct relationship and/ or for selecting one or more templates as described above.

Figure 2:
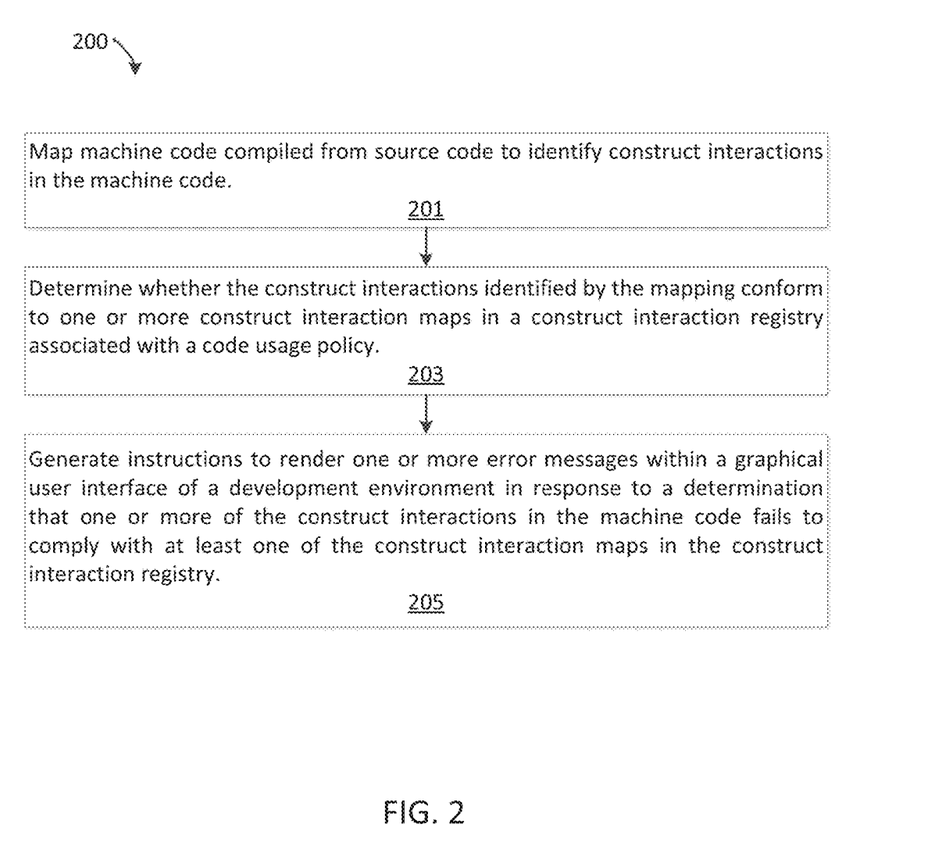
FIG. 2 is a flow diagram illustrating a method for dynamically enforcing a code usage policy in accordance with various embodiments.

Referring now to FIG. 2, a method 200 is provided for dynamically enforcing a code usage policy. The method includes the steps of mapping machine code compiled from source code to identify construct interactions in the machine code 201, determining whether the construct interactions identified by the mapping conform to one or more construct interaction maps in a construct interaction registry associated with a code usage policy 203, and generating instructions to render one or more error messages within a graphical user interface of a development environment in response to a determination that one or more of the construct interactions in the machine code fails to satisfy or comply with at least one of the construct interaction maps in the construct interaction registry 205.

The step of mapping machine code compiled from source code to identify construct interactions in the machine code 201 can be performed, for example but not limited to, using a monitoring component 105 stored in a memory 101 and executed by a processor 106 to map construct interactions within machine code compiled from source code in a development environment 107 as described above with reference to FIG. 1.

The step of determining whether the construct interactions identified by the mapping conform to one or more construct interaction maps in a construct interaction registry associated with a code usage policy 203 can be performed, for example but not limited to, using the processor 106 to compare the mapped interactions of the machine code from the monitoring component 105 with one or more construct interaction maps 102A-D of a construct interaction registry 103 as described above with reference to FIG. 1.

The step of generating instructions to render one or more error messages within a graphical user interface of a development environment in response to a determination that one or more of the construct interactions in the machine code fails to satisfy or comply with at least one of the construct interaction maps in the construct interaction registry 205 can be performed, for example but not limited to, using the processor 106 to identify, from comparison of the mapped interactions of the machine code from the monitoring component 105 with the one or more construct interaction maps 102A-D of the construct interaction registry 103, non-compliant interactions within the mapped machine code and instructing, via the monitoring component 105, the development environment 107 to render an error code within a graphical user interface of the development environment 107 as described above with reference to FIGS. 1 and 4A-B.

Figure 3:
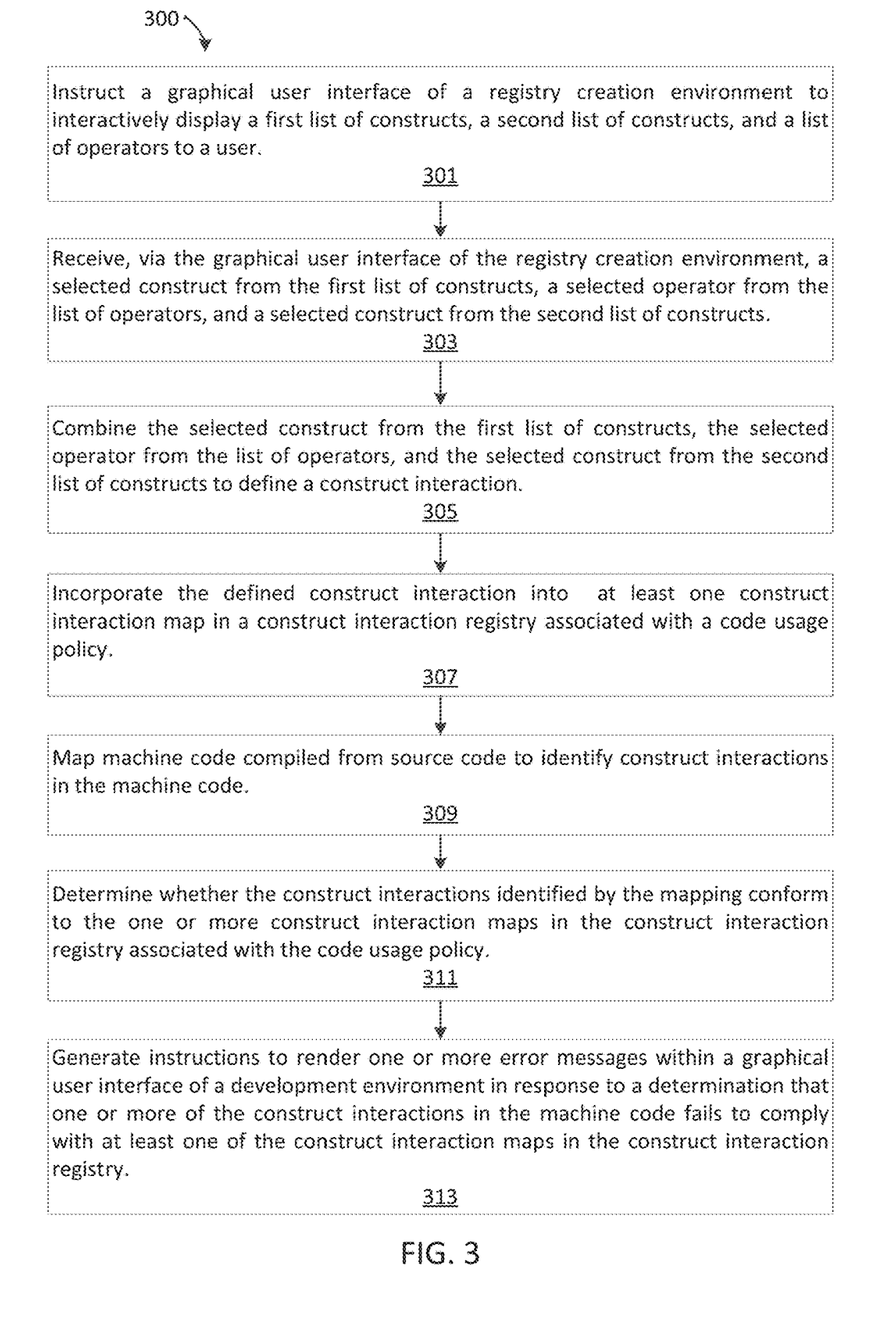
FIG. 3 is a flow diagram illustrating another method for dynamically enforcing a code usage policy in accordance with various embodiments.

Referring now to FIG. 3, a method 300 is provided for dynamically enforcing a code usage policy. The method includes the steps of instructing a graphical user interface of a registry creation environment to interactively display a first list of constructs, a second list of constructs, and a list of operators to a user 301, receiving, via the graphical user interface of the registry creation environment, a selected construct from the first list of constructs, a selected operator from the list of operators, and a selected construct from the second list of constructs 303, combining the selected construct from the first list of constructs, the selected operator from the list of operators, and the selected construct from the second list of constructs to define a construct interaction 305, incorporating the defined construct interaction into one or more construct interaction maps in a construct interaction registry associated with a code usage policy 307, mapping machine code compiled from source code to identify construct interactions in the machine code 309, determining whether the construct interactions identified by the mapping conform to the one or more construct interaction maps in the construct interaction registry associated with the code usage policy 311, and generating instructions to render one or more error messages within a graphical user interface of a development environment in response to a determination that one or more of the construct interactions in the machine code fails to comply with at least one of the construct interaction maps in the construct interaction registry 313.

The steps of instructing a graphical user interface of a registry creation environment to interactively display a first list of constructs, a second list of constructs, and a list of operators to a user 301, receiving, via the graphical user interface of the registry creation environment, a selected construct from the first list of constructs, a selected operator from the list of operators, and a selected construct from the second list of constructs 303, combining the selected construct from the first list of constructs, the selected operator from the list of operators, and the selected construct from the second list of constructs to define a construct interaction 305, and incorporating the defined construct interaction into one or more construct interaction maps in a construct interaction registry associated with a code usage policy 307 can be performed, for example, but not limited to, using a graphical user interface of a registry creation environment 109 to display constructs and operators to a user for creating one or more construct usage maps 102A-D to form the construct usage registry 103 as described above with reference to FIG. 1.

The step of mapping machine code compiled from source code to identify construct interactions in the machine code 309 can be performed, for example but not limited to, similar to step 201 as referred to above with reference to FIG. 2 and using a monitoring component 105 stored in a memory 101 and executed by a processor 106 to map construct interactions within machine code compiled from source code in a development environment 107 as described above with reference to FIG. 1.

The step of determining whether the construct interactions identified by the mapping conform to one or more construct interaction maps in a construct interaction registry associated with a code usage policy 311 can be performed, for example but not limited to, similar to step 203 as referred to above with reference to FIG. 2 and using the processor 106 to compare the mapped interactions of the machine code from the monitoring component 105 with one or more construct interaction maps 102A-D of a construct interaction registry 103 as described above with reference to FIG. 1.

The step of generating instructions to render one or more error messages within a graphical user interface of a development environment in response to a determination that one or more of the construct interactions in the machine code fails to comply with at least one of the construct interaction maps in the construct interaction registry 313 can be performed, for example but not limited to, similar to step 205 as referred to above with reference to FIG. 2 and using the processor 106 to identify, from comparison of the mapped interactions of the machine code from the monitoring component 105 with the one or more construct interaction maps 102A-D of the construct interaction registry 103, non-compliant interactions within the mapped machine code and instructing, via the monitoring component 105, the development environment 107 to render an error code within a graphical user interface of the development environment 107 as described above with reference to FIGS. 1 and 4A-B.

Exemplary Computing Devices

Figure 5:
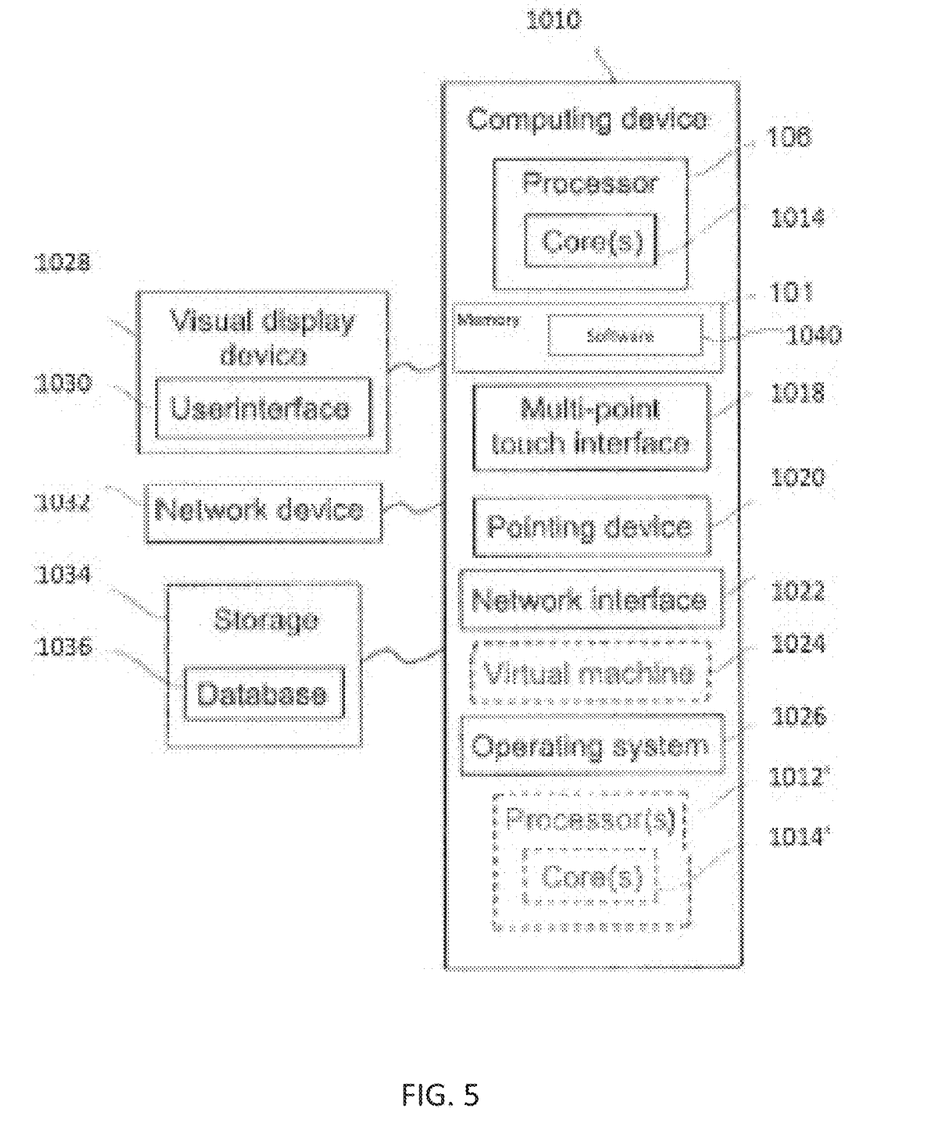
FIG. 5 is an example computational device block diagram depicting various components which can be used to implement various of the disclosed embodiments.

FIG. 5 is a block diagram of an exemplary computing device 1010 such as can be used, or portions thereof, in accordance with various embodiments and, for clarity, refers back to and provides greater detail regarding various elements of the system 100 of FIG. 1. The computing device 1010 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 101 included in the computing device 1010 can store computer-readable and computer-executable instructions or software for performing the operations disclosed herein. For example, the memory 101 can store a software application 1040 which is configured to perform various of the disclosed operations (e.g., create construct interaction registry 103 or operate monitoring component 105). The computing device 1010 can also include configurable and/or programmable processor 106 and an associated core 1014, and optionally, one or more additional configurable and/or programmable processing devices, e.g., processor(s) 1012' and associated core(s) 1014' (for example, in the case of computational devices having multiple processors/cores), for executing computer-readable and computer-executable instructions or software stored in the memory 101 and other programs for controlling system hardware. Processor 106 and processor(s) 1012' can each be a single core processor or multiple core (1014 and 1014') processor.

Virtualization can be employed in the computing device 1010 so that infrastructure and resources in the computing device can be shared dynamically. A virtual machine 1024 can be provided to handle a process running on multiple processors so that the process appears to be using only one computing resource rather than multiple computing resources. Multiple virtual machines can also be used with one processor.

Memory 101 can include a computational device memory or random access memory, such as DRAM, SRAM, EDO RAM, and the like. Memory 101 can include other types of memory as well, or combinations thereof.

A user can interact with the computing device 1010 through a visual display device 1028, such as a computer monitor, which can display one or more user interfaces 1030 that can be provided in accordance with exemplary embodiments. The computing device 1010 can include other I/O devices for receiving input from a user, for example, a keyboard or any suitable multi-point touch interface 1018, a pointing device 1020 (e.g., a mouse). The keyboard 1018 and the pointing device 1020 can be coupled to the visual display device 1028. The computing device 1010 can include other suitable conventional I/O peripherals.

The computing device 1010 can also include one or more storage devices 1034, such as a hard-drive, CD-ROM, or other computer readable media, for storing data and computer-readable instructions and/or software that perform operations disclosed herein. Exemplary storage device 1034 can also store one or more databases for storing any suitable information required to implement exemplary embodiments. The databases can be updated manually or automatically at any suitable time to add, delete, and/or update one or more items in the databases.

The computing device 1010 can include a network interface 1022 configured to interface via one or more network devices 1032 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1022 can include a built-in network adapter, network interface card, PCMCIA network card, card bus network adapter, wireless network adapter, USB network adapter, modem or any other device suitable for interfacing the computing device 1010 to any type of network capable of communication and performing the operations described herein. Moreover, the computing device 1010 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1010 can run any operating system 1026, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 1026 can be run in native mode or emulated mode. In an exemplary embodiment, the operating system 1026 can be run on one or more cloud machine instances.

Figure 6:
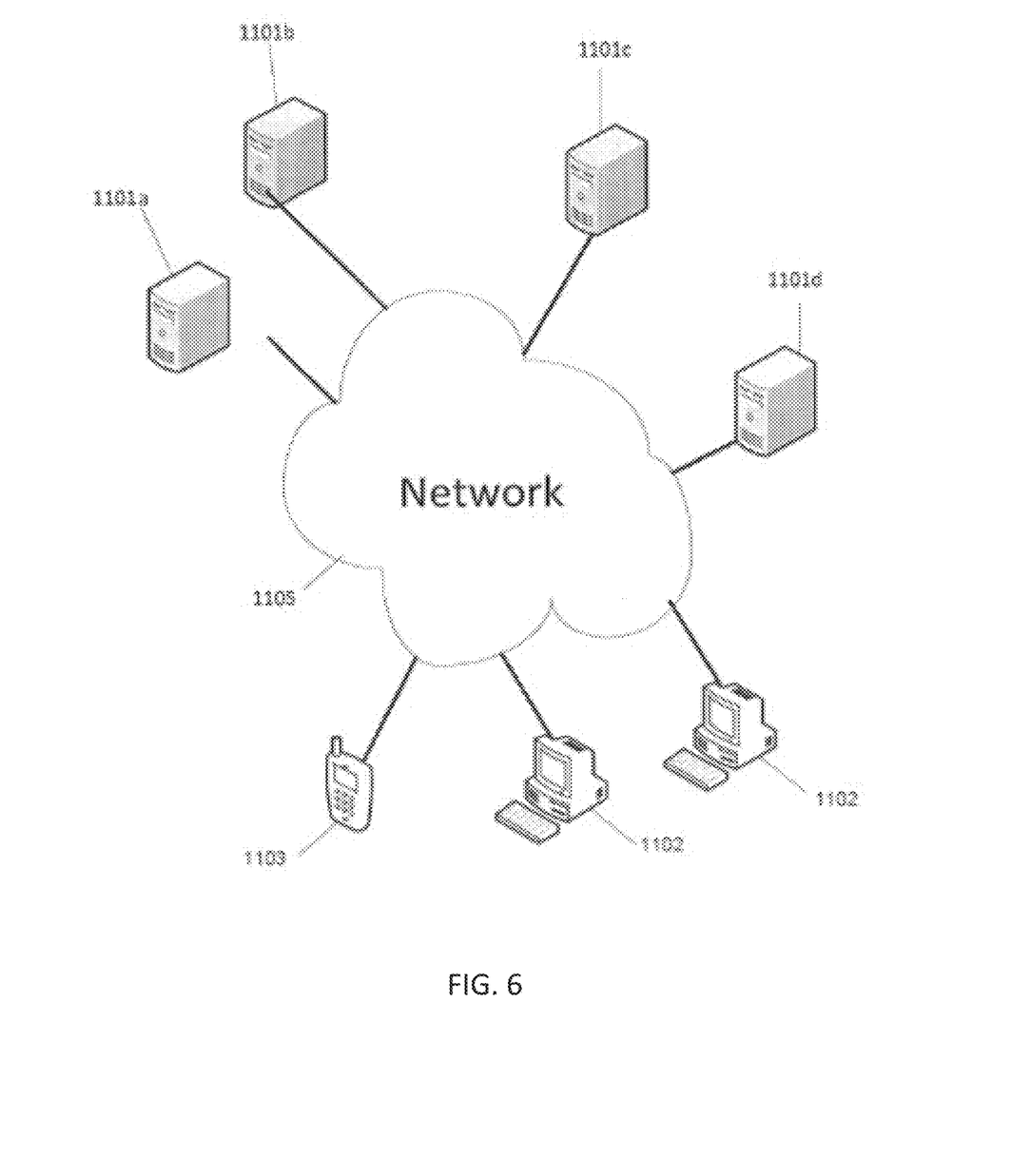
FIG. 6 is an example computational device block diagram depicting various components which can be used to implement various of the disclosed embodiments in a distributed system.

FIG. 6 is an example computational device block diagram of certain distributed embodiments. Although FIGS. 1 and 5, and portions of the exemplary discussion above, make reference to a centralized dynamic code usage policy enforcement system 100 operating on a single computing device, one will recognize that various of the modules within the code usage policy system 100 may instead be distributed across a network 1105 in separate server systems 1101a-d and possibly in user systems, such as a desktop computer device 1102, or mobile computer device 1103. As one example, users may download an application to their desktop computer device or mobile computer device, which is configured to run the registry creation environment 109 and/or run monitoring component 105 within a development environment 107. As another example, the downloaded application can be a client side application of a client-server environment, wherein one or more of the registry creation environment 109, the monitoring component 105, and/or the development environment 107 is hosted by a server and interacted with by the desktop computer device or mobile device. In some distributed systems, the modules of the multi-display system 100 can be separately located on server systems 1101*a-d* and can be in communication with one another across the network 1105.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for dynamically enforcing a code usage policy comprising:
    generating a construct interaction registry associated with the code usage policy, the construct interaction registry including a plurality of policy construct interaction maps;
    determining whether the plurality of policy construct interaction maps conflict with each other;
    continuously compiling source code to transform the source code to machine code, as the source code is being input;
    mapping machine code compiled from source code to generate compiled construct interaction maps identifying construct interactions in the machine code;
    determining whether the construct interactions identified by the mapping conform to one or more construct interaction maps in the construct interaction registry associated with the code usage policy;
    generating instructions to render one or more error messages within a graphical user interface of a development environment in a location of the source code responsible for one or more detected errors corresponding to the one or more error messages in response to a determination that one or more of the construct interactions in the machine code fails to comply with at least one of the construct interaction maps in the construct interaction registry;
    instructing a graphical user interface of a registry creation environment to interactively display a list of construct interaction registry templates, each of the construct interaction registry templates including at least one template construct interaction map;
    receiving, via the graphical user interface of the registry creation environment, a selected construct interaction registry template; and
    incorporating the at least one template construct interaction map of the selected construct interaction registry template into the construct interaction registry,
    wherein each construct interaction registry template corresponds to a tier in a tiered structure and inherits rules associated with tiers higher than the tier corresponding to each respective construct interaction registry template.

2. The method of claim 1, wherein at least one of the construct interaction maps defines a plurality of registered construct interactions, and conformance of each of the construct interactions identified in the machine code to at least one of the plurality of registered construct interactions complies with the code usage policy.

3. The method of claim 1, wherein at least one of the construct interaction maps defines a plurality of registered construct interactions, and a presence of any of the plurality of registered construct interactions in the machine code violates the code usage policy.

4. The method of claim 1, further comprising:
    displaying the source code within the graphical user interface of the development environment; and
    rendering the error messages within the graphical user interface of the development environment as annotations embedded within the source code.

5. The method of claim 1, further comprising executing the steps of mapping, determining, and generating in response to at least one of generation of additional source code, deletion of at least a portion of the source code, or revision of the source code within the development environment.

6. The method of claim 1, further comprising automatically executing the steps of mapping, determining, and generating in response to saving of the source code in the development environment.

7. The method of claim 1, further comprising executing the steps of mapping, determining, and generating in response to receiving an initiation command from a user.

8. The method of claim 1, wherein at least one of the construct interaction maps defines a one or more registered construct interactions, the one or more registered construct interactions being prescribed by the code usage policy.

9. The method of claim 8, wherein the code usage policy is a child policy of a parent policy and at least one of the registered construct interactions prescribed by the code usage policy is inherited from the parent policy.

10. The method of claim 1, further comprising:
    instructing a graphical user interface of a registry creation environment to interactively display a first list of constructs, a second list of constructs, and a list of operators to a user;
    receiving, via the graphical user interface of the registry creation environment, a selected construct from the first list of constructs, a selected operator from the list of operators, and a selected construct from the second list of constructs;

combining the selected construct from the first list of constructs, the selected operator from the list of operators, and the selected construct from the second list of constructs to define a construct interaction; and incorporating the defined construct interaction into at least one policy construct interaction map in the construct interaction registry.

11. The method of claim 1, wherein the selected construct interaction registry template is editable within the registry creation environment.

12. A system for dynamically enforcing a code usage policy comprising:
a memory; and
a processor configured to execute instructions stored in the memory, causing the system to:
generate a construct interaction registry associated with the code usage policy, the construct interaction registry including a plurality of policy construct interaction maps;
determine whether the plurality of policy construct interaction maps conflict with each other;
continuously compile source code to transform the source code to machine code, as the source code is being input;
map machine code compiled from source code to generate compiled construct interaction maps identifying construct interactions in the machine code,
determine whether the construct interactions identified by the mapping conform to one or more construct interaction maps in the construct interaction registry associated with the code usage policy, and
generate instructions to render one or more error messages within a graphical user interface of the development environment in a location of the source code responsible for one or more detected errors corresponding to the one or more error messages, in response to a determination that one or more of the construct interactions in the machine code fails to comply with at least one of the construct interaction maps in the construct interaction registry;
a display configured to interactively display a graphical user interface of a registry creation environment including a list of construct interaction registry templates, each of the construct interaction registry templates including at least one template construct interaction map, the processor further configured to;
receive, via the interactive display, a selected construct interaction registry template, and
incorporate the at least one template construct interaction map of the selected construct interaction registry template into the construct interaction registry,
wherein each construct interaction registry template corresponds to a tier in a tiered structure and inherits rules associated with tiers higher than the tier corresponding to each respective construct interaction registry template.

13. The system of claim 12, wherein at least one of the construct interaction maps defines a plurality of registered construct interactions, and conformance of each of the construct interactions identified in the machine code to at least one of the plurality of registered construct interactions complies with the code usage policy.

14. The system of claim 12, wherein at least one of the construct interaction maps defines a plurality of registered construct interactions, and a presence of any of the plurality of registered construct interactions in the machine code violates the code usage policy.

15. The system of claim 12, the processor further configured to:
display the source code within the graphical user interface of the development environment; and
render the error messages within the graphical user interface of the development environment as annotations embedded within the source code.

16. The system of claim 12, wherein the processor executes the instructions in response to at least one of generation of additional source code, deletion of at least a portion of the source code, or revision of the source code within the development environment.

17. The system of claim 12, wherein the processor automatically executes the instructions in response to saving of the source code in the development environment.

18. The system of claim 12, wherein the processor executes the instructions in response to receiving an initiation command from a user.

19. The system of claim 12, wherein at least one of the construct interaction maps defines a one or more registered construct interactions, the one or more registered construct interactions being prescribed by the code usage policy.

20. The system of claim 19, wherein the code usage policy is a child policy of a parent policy and at least one of the registered construct interactions prescribed by the code usage policy is inherited from the parent policy.

21. The system of claim 12, further comprising:
the display configured to interactively display the graphical user interface of a registry creation environment including a first list of constructs, a second list of constructs, and a list of operators, the processor further configured to:
receive, via the interactive display, a selected construct from the first list of constructs, a selected operator from the list of operators, and a selected construct from the second list of constructs,
combine the selected construct from the first list of constructs, the selected operator from the list of operators, and the selected construct from the second list of constructs to define a construct interaction, and
incorporate the defined construct interaction into at least one policy construct interaction map in the construct interaction registry.

22. The system of claim 12, wherein the selected construct interaction registry template is editable within the registry creation environment.

23. A non-transitory computer readable medium comprising instructions that when executed cause a computational device to:
generate a construct interaction registry associated with the code usage policy, the construct interaction registry including a plurality of policy construct interaction maps;
determine whether the plurality of policy construct interaction maps conflict with each other;
continuously compile source code to transform the source code to machine code, as the source code is being input;
map machine code compiled from source code to generate compiled construct interaction maps identify identifying construct interactions in the machine code;
determine whether the construct interactions identified by the mapping conform to one or more construct interaction maps in the construct interaction registry associated with the code usage policy; and
generate instructions to render one or more error messages within a graphical user interface of the development environment in a location of the source code responsible for one or more detected errors corresponding to the one or more error messages, in response to a determination that one or more of the construct interactions in the machine code fails to comply with at least one of the construct interaction maps in the construct interaction registry;

instruct a graphical user interface of a registry creation environment to interactively display a list of construct interaction registry templates, each of the construct interaction registry templates including at least one template construct interaction map;

receive, via the graphical user interface of the registry creation environment, a selected construct interaction registry template; and incorporate the at least one template construct interaction map of the selected construct interaction registry template into the construct interaction registry, wherein each construct interaction registry template corresponds to a tier in a tiered structure and inherits rules associated with tiers higher than the tier corresponding to each respective construct interaction registry template.

* * * * *